United States Patent Office 3,671,257
Patented June 20, 1972

3,671,257
COLOR SILVER HALIDE PHOTOGRAPHIC MATERIAL CONTAINING YELLOW-COLORED MAGENTA-FORMING COLOR COUPLER
Rigobert Otto, Leverkusen, and Gerrit Pankow, Opladen, Germany, Arthur Henri de Cat, Mortsel, Belgium, and Walter Puschel, Leverkusen, and Willibald Pelz, Opladen, Germany, assignors to Agfa-Gevaert Aktiengesellschaft, Leverkusen, Germany
Filed Mar. 20, 1968, Ser. No. 714,525
Claims priority, application Germany, Mar. 25, 1967, A 55,264
Int. Cl. G03c 1/40
U.S. Cl. 96—100
4 Claims

ABSTRACT OF THE DISCLOSURE

Yellow-colored magenta color-forming color couplers having the formula

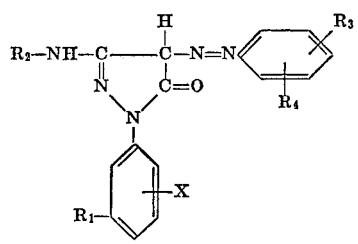

Figure 1:
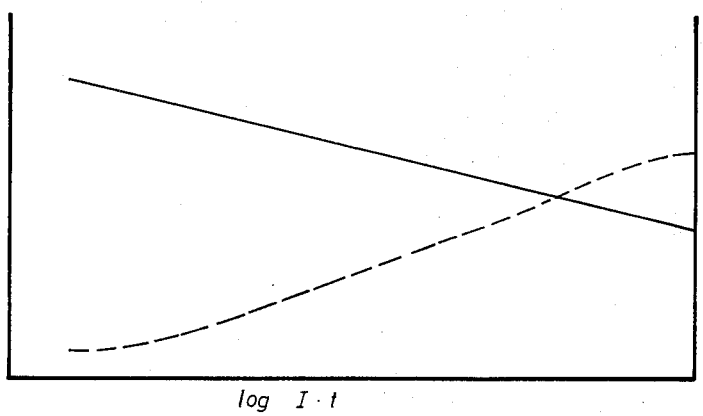

make very effective integral masks that compensate undesired blue side absorption of the magenta image.

---

The invention relates to a color photographic material providing improved color reproduction which contains color couplers for the production of so-called integral masks.

It is known to eliminate by masking, the side absorption of the color image produced by color-forming development with color couplers. This can be effected by the use of so-called integral masks. Such masks are produced during the photographic processing operation by using color couplers which are in themselves more or less strongly colored. Color couplers suitable for this purpose generally have the chemical structure of conventional color couplers, but contain at the coupling position for the reaction with the oxidized color developers, a chromophore group, generally an azo dye grouping, which imparts the desired coloring to the color coupler and which is split off during the reaction with the oxidized color developer. As a result the original color of the coupler is destroyed and a new dye is formed at the exposed and developed areas, while the original color is maintained at the unexposed areas.

To be suitable for use in color photography, the colored couplers must have certain properties. The integrated secondary absorptions of the image dyes in the blue spectral region must be compensated for by the integrated absorption of the masking dyes. This means that a yellow mask, e.g. for the green-sensitive layer, compensates the side absorption of the magenta dye in the blue region. The perfect masking dye would be one whose yellow density, after color development, would correspond exactly to the side absorption of the image dye at each point of the sensitometer curve. Actually, however, the yellow density of the azo dyes is, in most instances, substantially higher than necessary. This disadvantage can be overcome by using the colored color coupler together with a conventional uncolored coupler.

An essential preliminary condition for satisfying this requirement is a sufficient reactivity of the colored color coupler with developer oxidation products, so that sufficient azo dyes is destroyed upon reaction with color developer oxidation products and, in its place, sufficient magenta azomethine dye is formed.

However, the reactivity is very largely dependent on the constitution of both the pyrazolone and the azo portion of the molecule. Consequently, the requirements set forth are in many cases not sufficiently fulfilled by the colored couplers. In the unfavourable circumstances which frequently arise, sensitograms are obtained in which a high yellow dye density and a very low gamma value is obtained. Such dyes are unsuitable for use, because the gamma value required for negative materials is only reached with yellow densities which would lead to an unreasonable lengthening of the copying times for the resulting negative.

Too high a yellow density is, to some extent, harmless since such an "overmasking" for adjusting the necessary gamma of the magenta image can be compensated for simultaneously using a colorless magenta coupler. It is obvious that, in addition, the increased copying density in the blue absorption region caused by the masking dye must also remain within tenable limits.

The object of the present invention is to provide colored color couplers for the production of integral masks which satisfy practical requirements in respect of these photographic properties.

We now have found that colored color couplers of the following formula are excellently suitable for the production of integral masks:

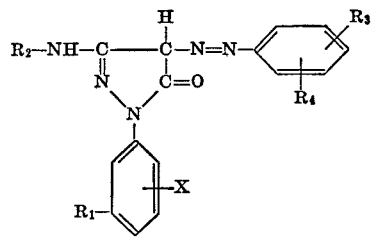

wherein $R_1$ represents hydrogen, halogen such as fluorine, chlorine or bromine or a sulfo group;

$R_2$ represents an acyl group more especially an acyl group derived from an aliphatic carboxylic acid with advantageously 12 to 18 carbon atoms, or a benzene carboxylic acid such as benzoyl, it being possible for the phenyl ring to contain other substituents, such as alkyl, halogen or sulfo groups;

X represents a substituent in the orth- or para-position to the pyrazolone ring and of the following types: an alkylthio or alkylsulfonyl group with up to 20 and advantageously 12 to 18 carbon atoms or an alkoxy group with up to 20 carbon atoms; groups of the two first-mentioned types are preferred;

$R_3$ represents an alkoxy group with preferably up to 4 carbon atoms in the ortho- or para-position to the azo grouping, it being possible for the alkyl portion to contain other substituents, such as alkoxy, halogen or more especially sulfo; and $R_4$ represents hydrogen, or an alkyl or alkoxy group with preferably up to 4 carbon atoms, which may contain further substituents, such as alkoxy, halogen or more especially sulfo, and also acylamino, whereby the acyl groups are preferably derived from aliphatic or aryl, carboxylic or sulfonic acids, more especially aliphatic carboxylic acid or sulfonic acids with up to 20 carbon atoms, and also from carboxylic or sulfonic acids of the phenyl series.

Particularly suitable are the colored color couplers of the following formulae:
(1)
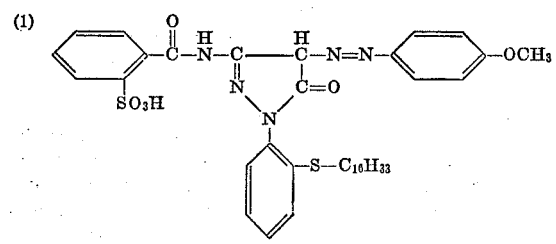
(2)
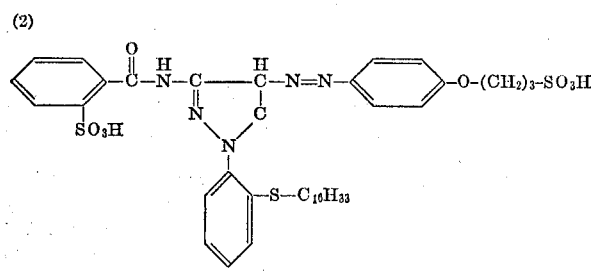
(3)
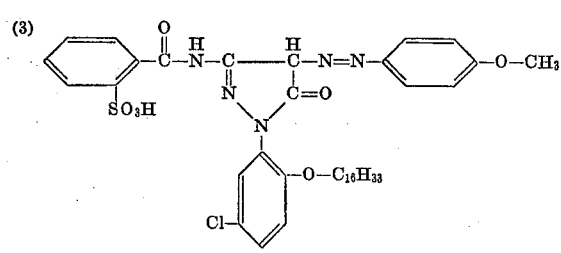
(4)
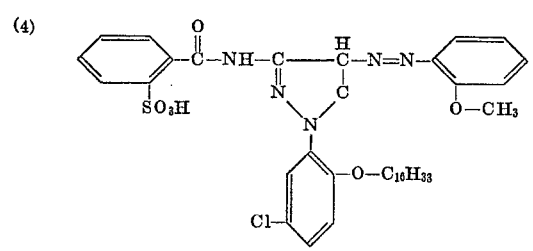
(5)
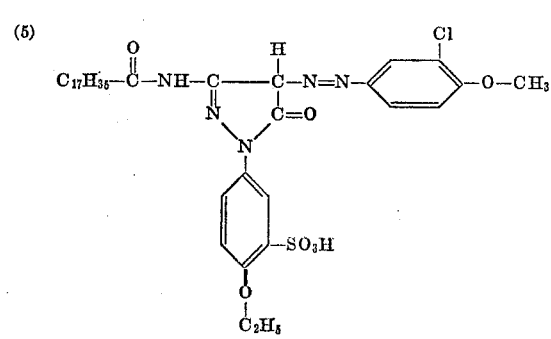
(6)
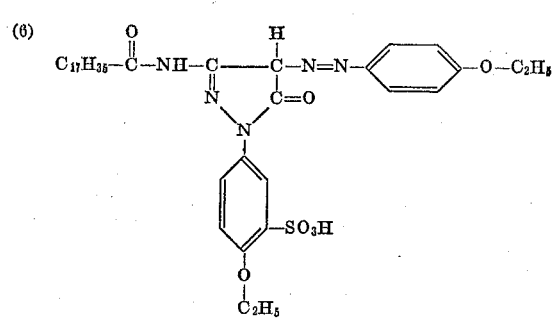
(7)
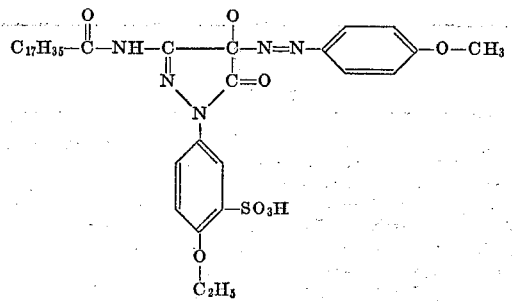
(8)
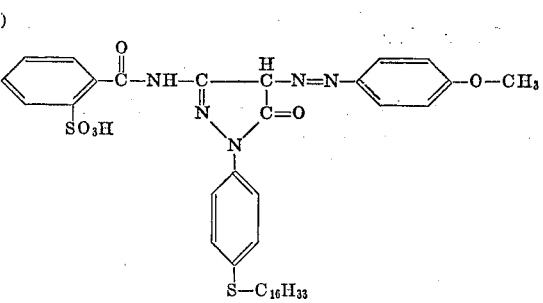
(9)
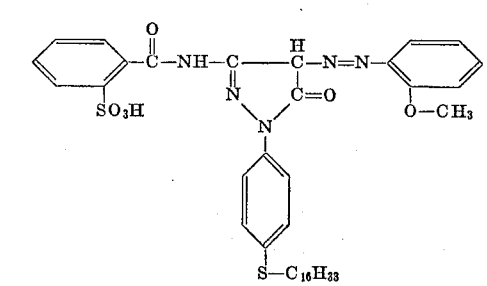
(10)
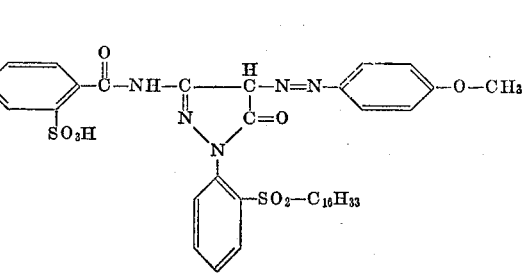
(11)
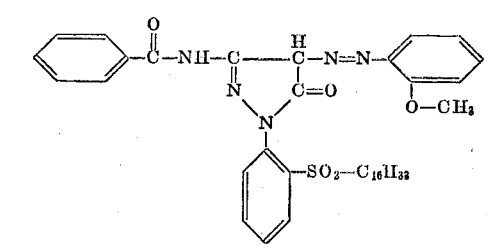
(12)
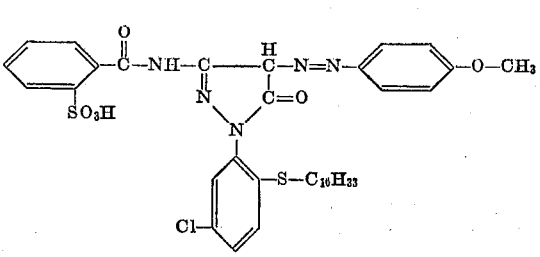

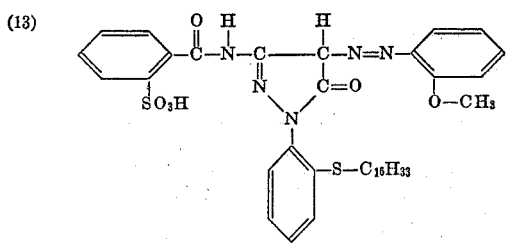

(13)

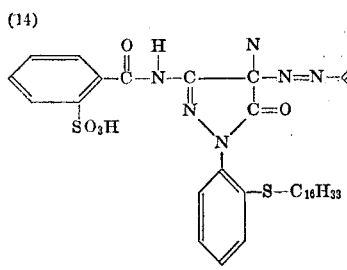

(14)

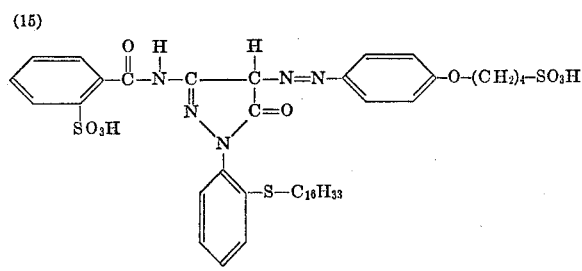

(15)

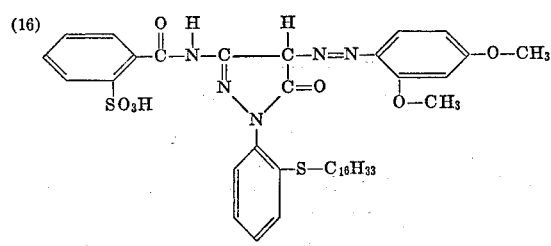

(16)

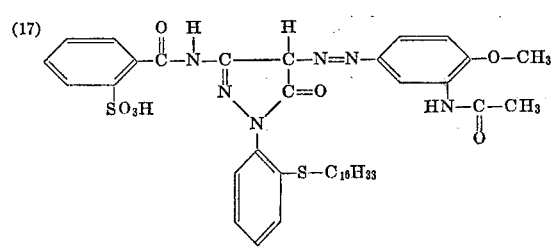

(17)

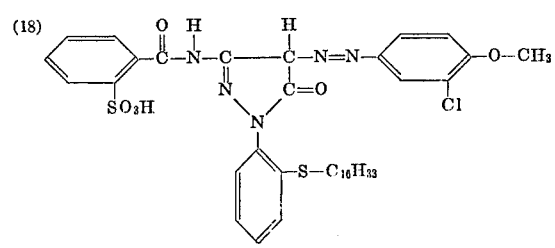

(18)

The dyestuffs are prepared in known manner by coupling the diazonium salts of the corresponding amines with the pyrazolones in question. It is particularly advantageous to perform the coupling in pyridine solution. The preparation of dye 1 is hereinafter described in detail.

Dye 1

3.5 g. of 4-anisidine are dissolved in 20 cc. of water containing 12 cc. of concentrated hydrochloric acid and diazotized at 0° C. with a solution of 2 g. of sodium nitrite in 10 cc. of water. The diazonium salt solution obtained is coupled, also at 0° C., with a solution of 15.5 g. of 1-(2'-cetylmercaptophenyl)-3-(2'-sulphobenzoyl) amidopyrazol-5-one in 150 cc. of pyridine. The dye is instantaneously formed. It is allowed to crystallize overnight and is then suction-filtered. After drying in a vacuum dryer over concentrated sulfuric acid, it is triturated in acetone to remove traces of pyridine and suction-filtered again. After drying, the dye is ready for use.

In the event of the dye not crystallizing out of the reaction mixture, the dye solution which is obtained is stirred into a mixture of excess concentrated hydrochloric acid and finely crushed ice and the operation as indicated above is continued. Instead of acetone, methanol or ethanol can also be used to remove edhering pyridine residues.

The pyrazolones which are used are prepared by known methods, as described for example in Org. Syntheses, 28, page 87 and in J. Ameri. Chem. Soc., 66, 1851 (1944).

For the acylation, the 3-aminopyrazolones are reacted with acid chlorides in known manner in the presence of an acid-bonding agent, e.g. pyridine. However, it is optionally possible also to use the corresponding anhydrides, e.g. benzoic acid-(1)-sulfonic acid-(2)-endoanhydride, for the acylation.

Provided the new colored color couplers used according to the invention contain long-chain aliphatic radicals and acid groups, i.e. are resistant to diffusion and soluble in water, they are dissolved in aqueous alkalis and added in this form to the photographic gelatino-silver halide emulsion. Hydrophobic color couplers can be dissolved in an organic solvent or oil former in the usual way and be dispersed into an aqueous gelatin solution.

The new color couplers have good compatibility with other conventional emulsion additives, such as spectral or chemical sensitizers or stabilizers. They are superior to the known couplers in respect of their absorption properties and their coupling rates which are about equal to the coupling rates of the uncolored magenta-forming couplers.

The couplers of the present invention are preferably used in a manner known per se in the green-sensitized gelatino-silver halide layer.

According to a preferred form of the present invention the new couplers are used together with uncolored magenta couplers. Colored and uncolored couplers are selected which form either the same magenta dye or a magenta dye of the same absorption upon color-forming development.

EXAMPLE 1

A solution of 1.5 g. of the yellow magenta coupler of Formula 2 in 3 cc. of water, which has been made alkaline by adding 2N-sodium hydroxide solution, and 100 cc. of a light-sensitive gelatino-silver bromide emulsion are mixed and cast onto a cellulose acetate layer support provided with a subbing layer.

The sample is exposed in a conventional sensitometer customarily employed in the art behind a grey test wedge. Development is then carried out in a color developer which contains 1-amino-4-diethylaminobenzene as color-forming developer and is then further processed in the usual manner.

A magenta dye is obtained at the exposed areas and yellow masking dye remains at the unexposed areas.

The sensitomeric properties of the images are shown in FIG. 1.

EXAMPLE 2

1.0 g. of the colored color coupler of Formula 1 is dissolved together with 0.5 g. of the colorless magenta coupler of the following formula

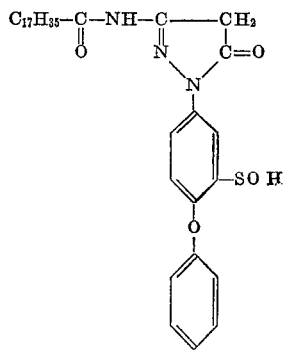

in 50 cc. of water made with alkaline with 2N-sodium hydroxide solution. This solution is mixed with 50 cc. of a geltino-silver bromide emulsion and the mixture is cast onto a cellulose acetate support.

It is processed as indicated in Example 1.

After developing, fixing and bleaching, a magenta dye image is obtained at the exposed areas with an absorption maximum of 546 m$\mu$ and the yellow masking dye image is obtained at the unexposed areas with an absorption maximum of 427 m$\mu$.

Figure 2:
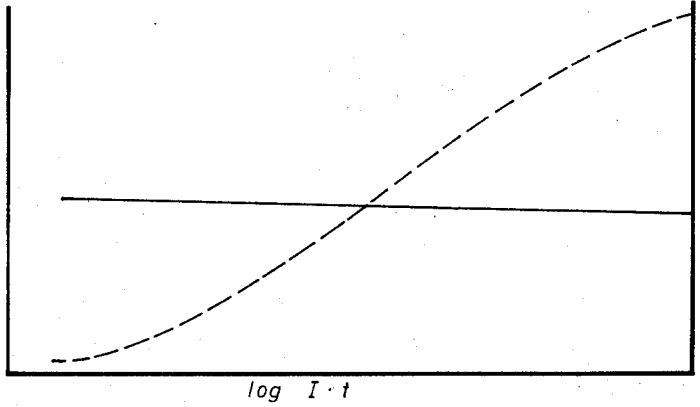

The excellent masking effect for the yellow side absorption of the color coupler is shown in the sensitogram of FIG. 2 of the accompanying drawing.

The colored color coupler according to the invention is clearly superior in its masking effect to the known colored color coupler, prepared, for example, by coupling diazotized 1-amino-4-methoxybenzene with 1-phenyl-3-stearylpyrazol-5-one.

In the sensitograms in FIGS. 1 and 2 of the accompanying drawings the full-line curve represents the measurement behind a blue filter and the dotted curve represents the measurement behind a green filter.

We claim:

1. A photographic silver halide emulsion containing a yellow-colored magenta-forming color coupler of the formula

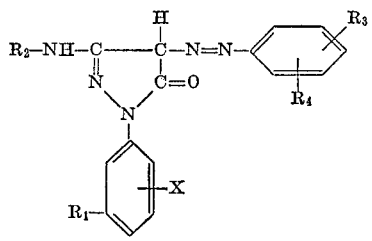

wherein:
$R_1$ represents hydrogen or chlorine;
$R_2$ represents a sulfobenzoyl group;
X represents alkylthio with 12 to 18 carbon atoms in the ortho- or para-position to the pyrazolone ring;
$R_3$ represents alkoxy with up to 4 carbon atoms in the ortho- or para-position to the azo grouping; and
$R_4$ represents hydrogen or alkyl, alkoxy or acylamino with up to 4 carbon atoms;
said color coupler having a coupling rate of the order of the coupling rate of uncolored magenta-forming couplers.

2. The composition of claim 1, wherein $R_3$ or $R_4$ represents an alkoxy group having up to 4 carbon atoms substituted with a sulfo group.

3. The composition of claim 1, wherein the magenta-forming coupler has the formula:

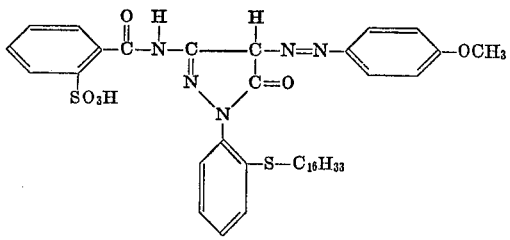

4. The composition of claim 1, wherein the magenta color coupler has the formula:

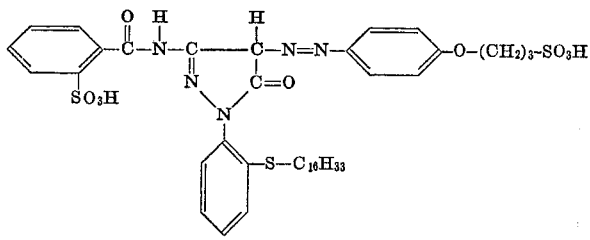

References Cited

UNITED STATES PATENTS

| | | | |
|---|---|---|---|
| 2,434,272 | 1/1948 | Jelley et al. | 96—100 |
| 2,437,063 | 3/1948 | Zeh et al. | 96—100 |
| 3,443,954 | 5/1969 | Menzel et al. | 96—100 |

FOREIGN PATENTS

| | | | |
|---|---|---|---|
| 666,407 | 7/1965 | Belgium | 96—56.5 |
| 745,545 | 2/1956 | Great Britain | 96—100 |

J. TRAVIS BROWN, Primary Examiner

U.S. Cl. X.R.

96—9